:::::::::::::::::::::::::::::::::::::::::::::::::::::::::::::::::::::::::::::::::::::::::::::::::::

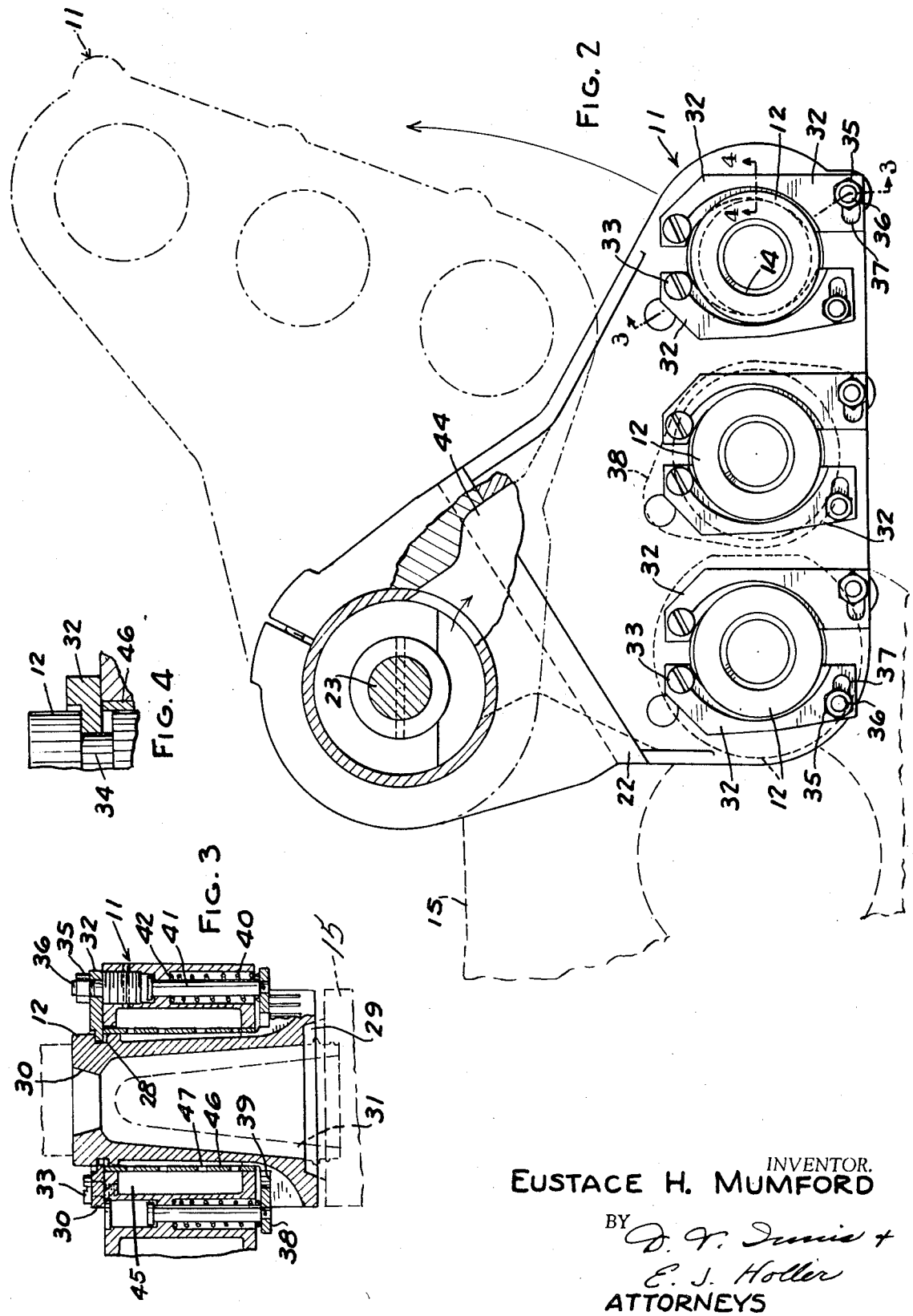

United States Patent Office 3,580,712
Patented May 25, 1971

---

3,580,712
GLASS FORMING MOLD ELEMENTS WITH YIELDING SUPPORTS
Eustace H. Mumford, Ottawa Lake, Mich., assignor to Owens-Illinois, Inc.
Filed Feb. 10, 1969, Ser. No. 797,974
Int. Cl. C03b 9/00, 9/40, 11/00
U.S. Cl. 65—307    11 Claims

ABSTRACT OF THE DISCLOSURE

A glass forming machine wherein a plurality of charges of glass are delivered to a plurality of parison or blank mold cavities and are formed into parisons after which the parisons are inverted and delivered to a blow mold at another station for forming the final article. Means are provided for yielding by supporting and cooling each parison or blank mold.

---

This invention relates to glass forming machines.

BACKGROUND OF THE INVENTION

In one type of glass forming machine, more commonly known as individual section type of machine, the machine comprises a plurality of sections. Each section includes a parison or blank mold to which a glass charge is delivered to be formed into a parison and after forming the parison is inverted and delivered to another station where a blow mold closes about the parison to form the final article. The forming of the parison at the parison forming station may be either by pressing or blowing.

Where a plurality of charges are formed in each section of the machine, substantial difficulty may be achieved in providing operating clearances between the various components of the machine. Accordingly, among the objects of the invention are to provide a machine which will produce a plurality of parisons simultaneously; wherein the operation can be effectively provided without interference of one part with another; wherein novel means are provided for supporting parison or blank molds.

SUMMARY

A glass forming machine wherein a plurality of charges of glass are delivered to a plurality of parison mold cavities and are formed into parisons after which the parisons are inverted and delivered to a blow mold at another station for forming the final article. Means are provided for yielding by supporting and cooling each parison mold.

DESCRIPTION OF THE DRAWINGS

FIG. 2 is a fragmentary sectional view taken along the line 2—2 in FIG. 1.

FIG. 3 is a fragmentary sectional view taken along the line 3—3 in FIG. 2.

FIG. 4 is a fragmentary sectional view taken along the line 4—4 in FIG. 2.

DESCRIPTION

Figure 1:
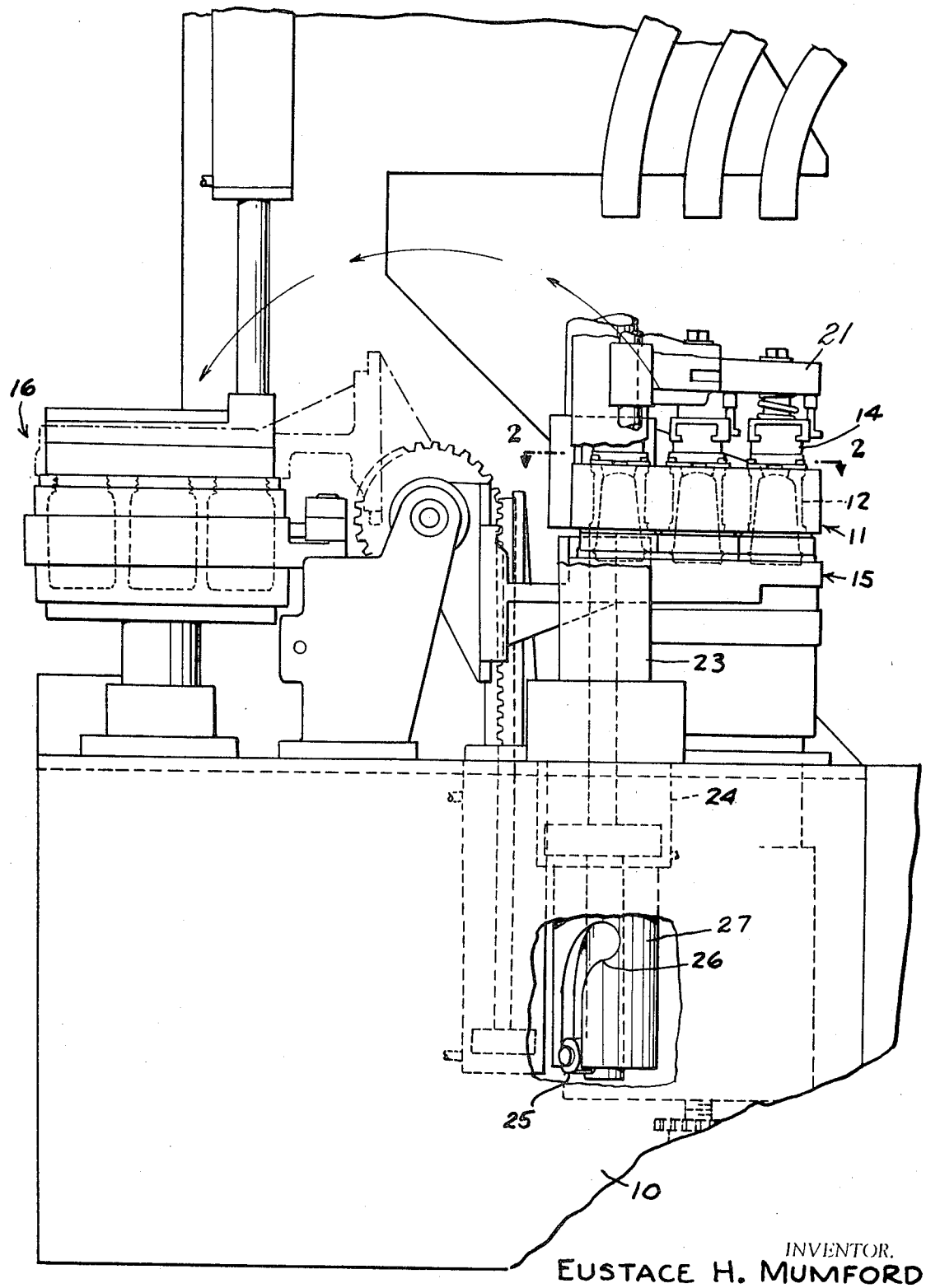
FIG. 1 is a partly diagrammatic elevational view of a machine embodying the invention.

Referring to FIG. 1, the machine embodying the invention comprises a base 10 which supports a blank mold assembly 11 having a plurality of parison or blank molds 12, each of which has a mold cavity 13. Each parison mold 12 has an open upper end to which a charge of glass is delivered. Baffles 14 are moved to close the upper end of the molds and the parison is formed in the blank molds by pressing or blowing from below. After forming, the parisons are simultaneously inverted by a neck ring assembly 15 and transferred to a blow mold station wherein blow molds 16 are closed about the parisons and the parisons are blown to final form. Each of the baffle 14 is supported on a baffle holder 21 for movement into and out of overlying relationship with blank mold assembly 11.

In accordance with the invention as shown in FIGS. 2-4, each blank mold assembly 11 comprises a support arm 22 that is clamped to a shaft 23. As shown in FIG. 1, the shaft 23 comprises the shaft of a piston motor 24 and has a cam follower roller 25 on its lower end engaging a helical cam track 26 of a fixed cam 27. By this arrangement, actuation of the cylinder 24 causes the shaft 23 to move axially and rotate bringing the mold arm into and out of overlying relationship with the neck ring assembly 15.

Referring to FIGS. 2-4, the mold arm 22 is provided with a plurality of blank mold openings 28 and a one-piece blank mold 12 is provided in each opening. Each blank mold has an open lower end 29 and an open upper end 30. The lower end of each blank mold is adapted to register with a neck ring of the neck ring assembly 15 and the upper end is adapted to receive a glass charge after which a baffle 14 closes the upper end to permit a plunger 31 to be moved upwardly and thereby shape the parison or blank.

Each mold 12 is retained in its respective opening by support plates 32 that are pivoted by screws 33 to the upper surface of arm 22 and engage grooves 34 in the periphery of the upper end of the mold 12. Each support plate 32 is secured in position for clamping the mold by a nut 35 that is threaded on a stud 36 on arm 22 extending through an elongated slot 37. The slots 37 permit swinging movement of the support plate 32 outwardly for removal of each mold 12.

Each mold is further provided with an annular pressure plate or ring 38 that engages a shoulder 39 adjacent the lower end of the mold. Compression springs 40 are telescoped over pins 41 fixed to the pressure ring and interposed between the upper surface of pressure ring 38 and the base 42 of slots 43 in the arm.

Means are provided for cooling the periphery of each mold and comprise a hollow chamber 44 in each arm 22 to which cooling fluid such as air is supplied. The chamber 44 communicates with an annular area 45 surrounding each opening 28. The side wall 46 of each opening 28 is provided with passages 47 through which the fluid can flow against the side of each mold 12 to cool the side of the mold.

In operation, the cylinder 24 is operated to bring the blank molds into position and registry with the neck rings of the neck ring assembly 15. Each mold 12 is yieldingly urged downwardly by the springs 40 against its respective neck ring thereby taking up any clearance and insuring a proper fit. Since the molds 12 are mounted independently of one another, any interference of one does not affect the other. Charges of glass are then delivered to the open end 30, the baffles 14 are brought into position and the plungers 31 actuated to form the parisons. Subsequently, the baffles 14 are moved out of position, the molds 40 are moved axially and thereafter rotated horizontally to strip the resultant parisons from the molds 12. The neck ring assembly 15 is then oscillated to carry the parisons from the blank mold station 16 to the finish or blow station 15 where the final article is formed in accordance with conventional practice.

I claim:

1. In a machine wherein a plurality of charges of glass are delivered to the mold cavities of an open end parison mold assembly at one station and are formed into a parison and thereafter the parisons are inverted by a neck ring assembly and delivered to a blow mold at another station, the combination comprising
- a mold support arm,
- means for supporting said mold support arm for movement toward and away from overlying relationship with the neck ring assembly at the blank mold station,
- said mold support arm having a plurality of spaced mold receiving openings,
- a one-piece open end mold in each said opening,
- interengaging means between each said mold and its respective opening,
- and means yieldingly urging each said mold in a direction toward the neck ring assembly when the mold is in registry with the neck ring assembly.

2. The combination set forth in claim 1 wherein said means for moving said mold arm comprises a vertical shaft,
- said mold arm being fixed to said shaft,
- and means for rotating and axially moving said shaft.

3. The combination set forth in claim 1 wherein said mold arm has a cavity therein,
- each said opening in said mold arm having a side wall with openings therein communicating with the chamber whereby fluid supplied to said chamber may be directed against the sides of the mold supported in the opening.

4. The combination set forth in claim 1 wherein said interengaging means between each said mold and said mold arm comprises supporting plates,
- said mold having transversely engaging grooves in one end thereof for receiving portions of said supporting plates,
- said supporting plates being movable with respect to said mold arm to permit removal of said molds.

5. The combination set forth in claim 1 wherein said means yieldingly urging said mold comprises
- springs interposed between the mold and the mold arm.

6. The combination set forth in claim 5 wherein said springs extend into axial openings in said arm, and an annular pressure plate is interposed between a portion of said mold and said springs.

7. The combination comprising
- a mold support arm,
- said mold support arm having a plurality of spaced mold receiving openings,
- a one-piece open end mold for each said opening,
- interengaging means between each said mold and its respective opening,
- and means yieldingly urging each said mold in an axial direction.

8. The combination set forth in claim 7 wherein said mold arm has a cavity therein,
- each said opening in said mold arm having a side wall with openings therein communicating with the chamber whereby fluid supplied to said chamber may be directed against the sides of the mold supported in the opening.

9. The combination set forth in claim 7 wherein said interengaging means between each said mold and said mold arm comprises supporting plates,
- said mold having transversely engaging grooves in one end thereof for receiving portions of said supporting plates,
- said supporting plates being movable relative to said mold arm to permit removal of said molds.

10. The combination set forth in claim 7 wherein said means yieldingly urging said mold comprises
- springs interposed between the mold and the mold arm.

11. The combination set forth in claim 10 wherein said springs extend into axial openings in said arm, and an annular pressure plate is interposed between a portion of said mold and said springs.

References Cited
UNITED STATES PATENTS

| | | | |
|---|---|---|---|
| 1,182,448 | 5/1916 | Bingham | 65—361X |
| 2,334,653 | 11/1943 | Senkbeil | 65—323X |
| 2,466,669 | 6/1949 | Winder | 65—360X |
| 3,024,571 | 3/1962 | Abbott et al. | 65—361X |
| 3,338,699 | 8/1967 | Colchagoff et al. | 65—361X |
| 3,251,668 | 5/1966 | Brymer | 65—361X |
| 3,273,991 | 9/1966 | Denman | 65—307 |

FRANK W. MIGA, Primary Examiner

U.S. Cl. X.R.

65—323, 359, 361, 355, 236, 232